United States Patent
Morisaku et al.

(10) Patent No.: US 9,530,995 B2
(45) Date of Patent: Dec. 27, 2016

(54) BATTERY MODULE

(71) Applicant: KABUSHIKI KAISHA TOYOTA JIDOSHOKKI, Aichi-ken (JP)

(72) Inventors: Naoto Morisaku, Kariya (JP); Hiromi Ueda, Kariya (JP); Takayuki Kato, Kariya (JP)

(73) Assignee: KABUSHIKI KAISHA TOYOTA JIDOSHOKKI, Aichi-Ken (JP)

( * ) Notice: Subject to any disclaimer, the term of this patent is extended or adjusted under 35 U.S.C. 154(b) by 0 days.

(21) Appl. No.: 14/914,877

(22) PCT Filed: Aug. 21, 2014

(86) PCT No.: PCT/JP2014/071927
§ 371 (c)(1),
(2) Date: Feb. 26, 2016

(87) PCT Pub. No.: WO2015/033795
PCT Pub. Date: Mar. 12, 2015

(65) Prior Publication Data
US 2016/0218337 A1    Jul. 28, 2016

(30) Foreign Application Priority Data
Sep. 5, 2013  (JP) ................. 2013-184166

(51) Int. Cl.
*H01M 2/12* (2006.01)
*H01M 2/10* (2006.01)

(52) U.S. Cl.
CPC ......... *H01M 2/1252* (2013.01); *H01M 2/1022* (2013.01); *H01M 2/1077* (2013.01); *H01M 2/1205* (2013.01)

(58) Field of Classification Search
CPC  H01M 2/1252; H01M 2/1022; H01M 2/1077; H01M 2/1205
See application file for complete search history.

(56) References Cited

U.S. PATENT DOCUMENTS 4,098,963 A    7/1978  Mocas
7,754,374 B2   7/2010  Hashida et al.
(Continued)

FOREIGN PATENT DOCUMENTS

DE  10 2011 109 249   2/2013
JP  2006-120488       5/2006
(Continued)

OTHER PUBLICATIONS

International Search Report for PCT/JP2014/071927 with English-language Translation, having a mailing date of Oct. 7, 2014.
(Continued)

*Primary Examiner* — Raymond Alejandro
(74) *Attorney, Agent, or Firm* — Greenblum & Bernstein, P.L.C.

(57) ABSTRACT

This battery module comprises a secondary battery, a battery holder, a cover member and a pair of extended parts. The secondary battery comprises an electrode assembly, a case and an open valve. The cover member has a main body that faces the open valve. The pair of extended parts are provided between the case and the main body of the cover member. The open valve is positioned between the pair of extended parts. The case, the main body of the cover member and the pair of extended parts form a flow path for a gas that is discharged from the open valve. The battery holder has a lock projection that is locked to the main body of the cover member.

7 Claims, 4 Drawing Sheets

(56) References Cited

U.S. PATENT DOCUMENTS

| | | | |
|---|---|---|---|
| 8,586,226 B2* | 11/2013 | Hashida | H01M 2/1016 429/151 |
| 8,597,808 B2* | 12/2013 | Park | H01M 2/1072 429/53 |
| 8,691,420 B2* | 4/2014 | Yoo | H01M 2/1055 429/100 |
| 8,748,021 B2 | 6/2014 | Lim | |
| 8,802,254 B2* | 8/2014 | Lee | H01M 2/1223 429/53 |
| 2006/0178051 A1 | 8/2006 | Hashida et al. | |
| 2010/0073005 A1 | 3/2010 | Yano et al. | |
| 2012/0094155 A1 | 4/2012 | Lim | |
| 2012/0319695 A1 | 12/2012 | Yano et al. | |
| 2013/0002017 A1 | 1/2013 | Yano et al. | |
| 2014/0023893 A1 | 1/2014 | Shimizu et al. | |

FOREIGN PATENT DOCUMENTS

| | | |
|---|---|---|
| JP | 2006-228706 | 8/2006 |
| JP | 2010-80135 | 4/2010 |
| JP | 2010-287550 | 12/2010 |
| JP | 2011-060675 | 3/2011 |
| JP | 2012-89499 | 5/2012 |
| JP | 2012-109126 | 6/2012 |
| JP | 2012-113896 | 6/2012 |
| JP | 2012-128984 | 7/2012 |
| JP | 2012-243608 | 12/2012 |
| JP | 2012-248482 | 12/2012 |

OTHER PUBLICATIONS

Written Opinion of International Search Authority for PCT/JP2014/071927 with English-language Translation, having a mailing date of Oct. 7, 2014.

Partial Supplementary European Search Report for EP 14842156.3 having a mailing date of Oct. 6, 2016.

* cited by examiner

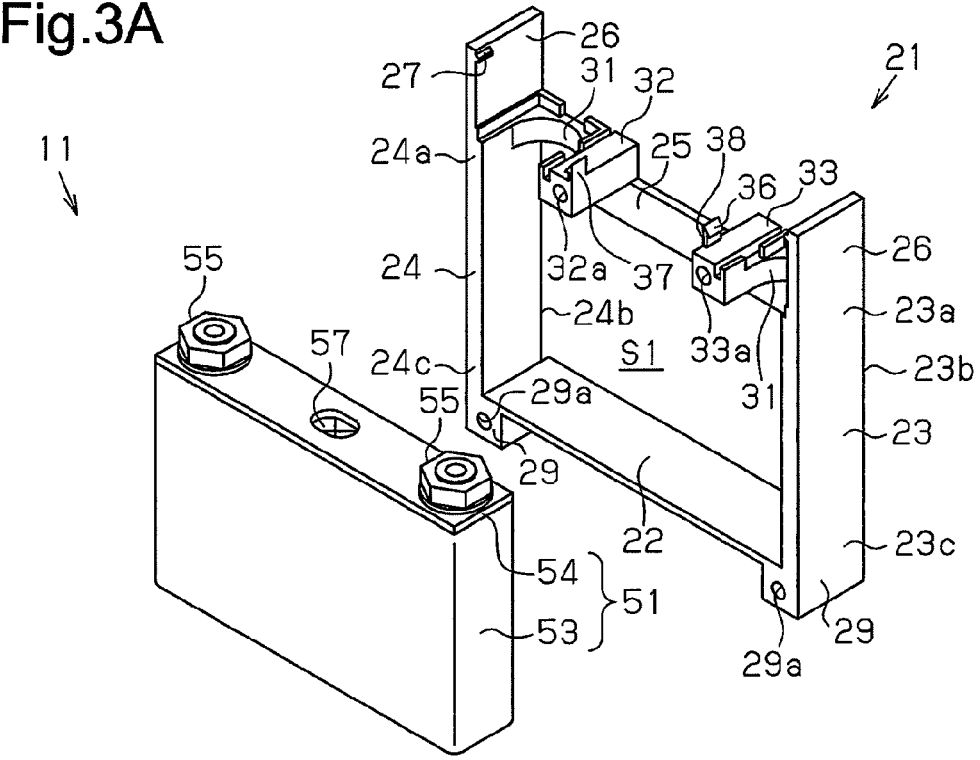
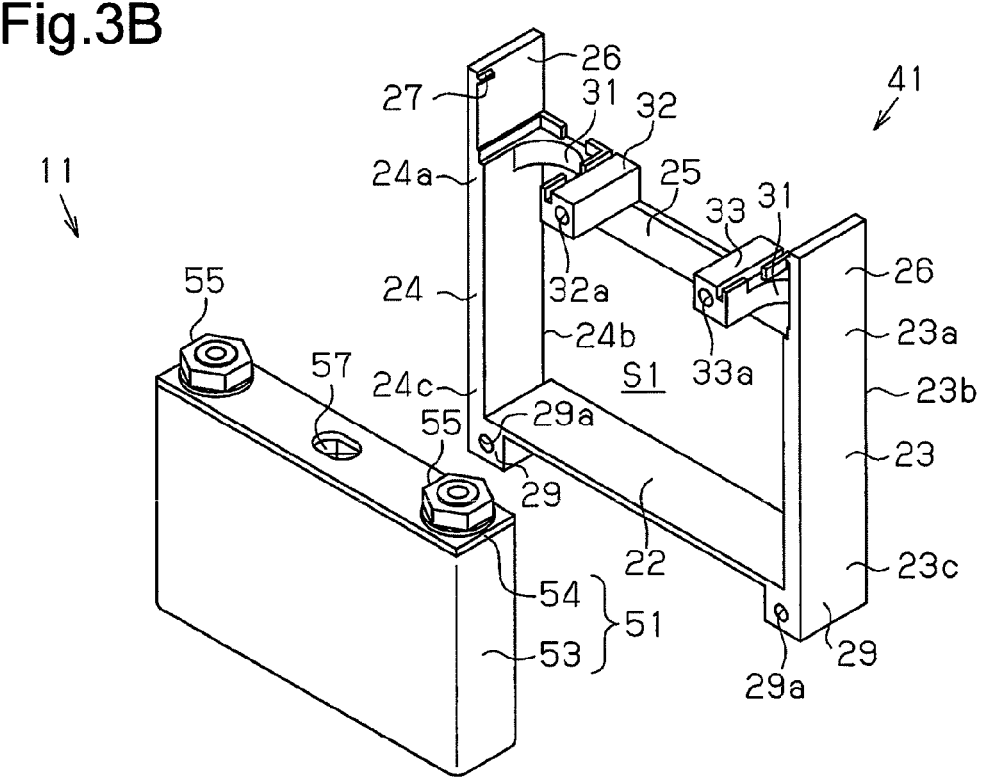

BATTERY MODULE

TECHNICAL FIELD

The present invention relates to a battery module including a flow passage that discharges gas from rechargeable batteries.

BACKGROUND ART

Rechargeable batteries include valves that open and reduce the internal pressure of a case when the internal pressure of the case exceeds a predetermined pressure. When the valves open, gas is discharged out of the case. This reduces the internal pressure of the case.

Patent document 1 describes a battery module that includes a battery cell having a vent, which serves as a discharge passage for gas generated in the battery cell. The upper portion of the vent includes a degassing cover. The degassing cover, which is adhered and fixed to the upper portion of the vent, includes a degassing cover portion, a first extension, a second extension, and two first partition walls that extend between the first extension and the second extension. The first extension, the second extension, and the two first partition walls extend from one surface of the degassing cover portion toward a vent region of the battery cell. In the upper portion of the battery cell, the degassing cover portion, the first extension, the second extension, and the two first partition walls define a passage, through which gas is discharged.

PRIOR ART DOCUMENT

Patent Document

Patent Document 1: Japanese Laid-Open Patent Publication No. 2012-89499

SUMMARY OF THE INVENTION

Problems that are to be Solved by the Invention

Deformation of the degassing cover caused by repeated expansion and contraction under ambient temperature or by vibration or the like may form gaps between the battery cell and the degassing cover, and gas may leak out of the gaps. The leakage of gas may affect peripheral electronic components. Thus, it is desirable that the leakage of gas from a flow passage be limited.

It is an object of the present invention to provide a battery module that limits situations in which gas discharged from release valves of rechargeable batteries leaks out of a flow passage.

Means for Solving the Problem

To achieve the above object, a battery module according to one aspect of the present invention includes a rechargeable battery, a battery holder, a cover member, and two extensions. The rechargeable battery includes an electrode assembly including a positive electrode and a negative electrode, a case that accommodates the electrode assembly, and a release valve that releases gas from the case to an outer side of the case. The battery holder holds the rechargeable battery. The cover member includes a body opposed to the release valve. The two extensions are arranged between the case and the body of the cover member. The two extensions are opposed to each other so that the release valve is located between the two extensions. The case, the body of the cover member, and the two extensions define a flow passage for gas discharged from the release valve. The battery holder includes an engagement projection that engages the body of the cover member.

BRIEF DESCRIPTION OF THE DRAWINGS

FIG. 3A is a perspective view of a first battery holder shown in FIG. 1, and FIG. 3B is a perspective view of a second battery holder shown in FIG. 1.

EMBODIMENTS OF THE INVENTION

One embodiment of a battery module will now be described.

Figure 1:
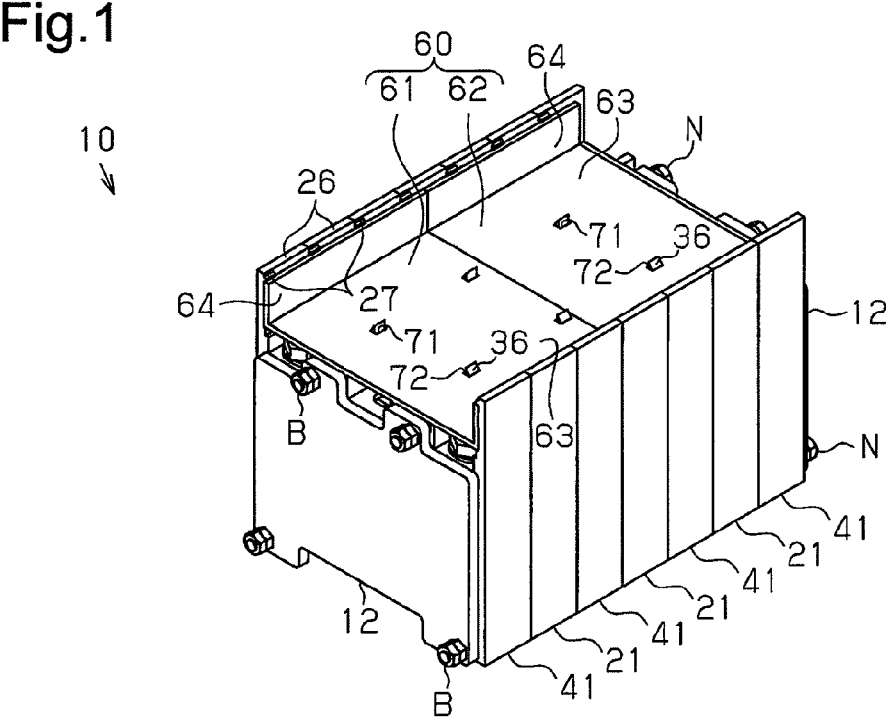
FIG. 1 is a perspective view showing a battery module according to one embodiment of the present invention.
Figure 2:
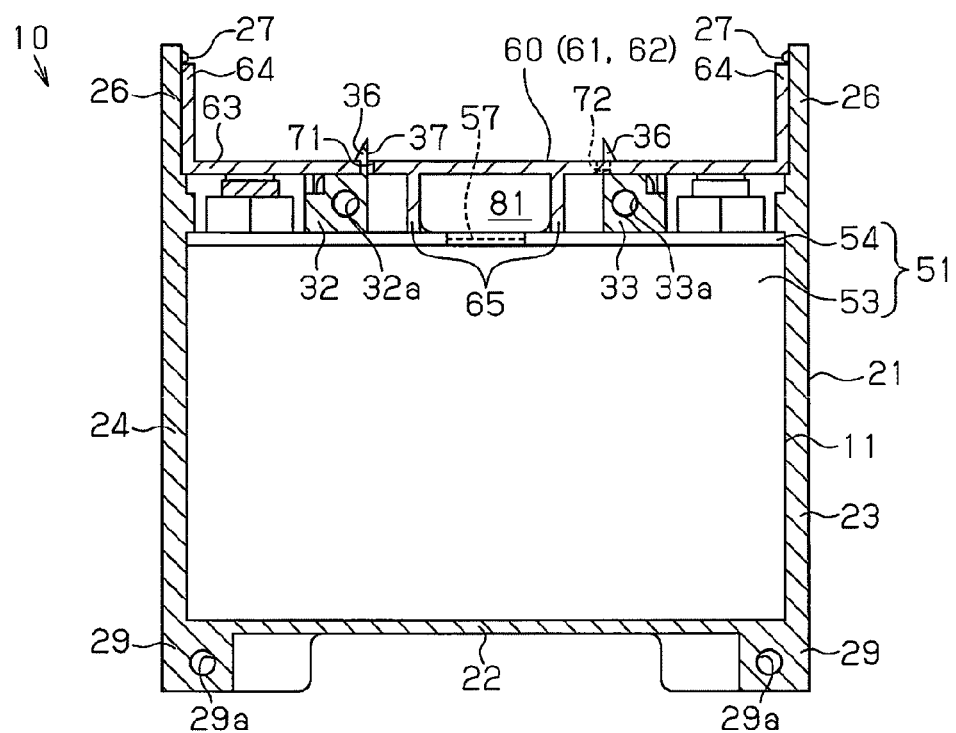
FIG. 2 is a cross-sectional view of the battery module shown in FIG. 1.

As shown in FIGS. 1 and 2, a battery module 10 includes rechargeable batteries 11 (for example, lithium-ion rechargeable batteries or nickel metal hydride batteries) that are arranged next to one another. The rechargeable batteries 11 are held by battery holders 21 and 41. The present embodiment uses two types of battery holders 21 and 41, namely, the first battery holders 21 and the second battery holders 41. The first battery holders 21 and the second battery holders 41 are alternately arranged. End plates 12 are respectively arranged on the two ends in the direction the rechargeable batteries 11 are laid out. Bolts B are inserted through the end plates 12 and the battery holders 21 and 41. The bolts B are inserted from one end plate 12 toward the other end plate 12 and fastened to nuts N at the other end plate 12.

As shown in FIG. 3A, the first battery holder 21 includes a first cover 22, which has the form of a rectangular plate. A second cover 23 and a third cover 24, which have the form of rectangular plates and extend in the thickness-wise direction of the first cover 22, are respectively arranged on the two longitudinal ends of the first cover 22. The second cover 23 includes a longitudinal first end 23a, that is, a longitudinal end opposite to the end on which the first cover 22 is arranged, and a first lateral end 23b. The third cover 24 includes a longitudinal first end 24a, that is, a longitudinal end opposite to the end on which the first cover 22 is arranged, and a first lateral end 24b. A fourth cover 25, which has the form of a rectangular plate, extends between a portion of the longitudinal first end 23a at the side of the first lateral end 23b and a portion of the longitudinal first end 24a at the side of the first lateral end 24b. The thickness-wise direction of the fourth cover 25 corresponds to the lateral direction of the covers 23 and 24. The longitudinal direction of the fourth cover 25 corresponds to the direction the second cover 23 and the third cover 24 are opposed to each other. The direction orthogonal to the thickness-wise direction and the longitudinal direction of the fourth cover 25 defines the lateral direction of the fourth cover 25. The region surrounded by the first cover 22, the second cover 23, and the third cover 24 defines the accommodation portion S1, which accommodates the rechargeable battery 11.

Protrusions 26, which have the form of rectangular plates and extend in the longitudinal direction of the covers 23 and 24, respectively extend continuously from the longitudinal first end 23a of the second cover 23 and the longitudinal first end 24a of the third cover 24. Projections 27, which project in the thickness-wise direction of the protrusions 26, are respectively arranged at the opposing surfaces of the protrusions 26. The second cover 23 and the third cover 24 respectively include longitudinal second ends 23c and 24c. The longitudinal second ends 23c and 24c respectively include legs 29, which have the form of square pillars. The axes of the legs 29 extend in the lateral direction of the covers 23 and 24. An insertion hole 29a extends through each leg 29 in the axial direction of the leg 29. The bolt B is inserted through the insertion hole 29a.

Terminal accommodation portions 31 are respectively arranged on a lateral end surface of the fourth cover 25 at the two longitudinal ends of the fourth cover 25. Each terminal accommodation portion 31 is U-shaped and opens in the thickness-wise direction of the fourth cover 25. One terminal accommodation portion 31 is continuous with the second cover 23, and the other terminal accommodation portion 31 is continuous with the third cover 24.

The lateral end surface of the fourth cover 25 includes pillars 32 and 33, which have the form of square pillars. The pillars 32 and 33 are arranged adjacent to the terminal accommodation portions 31. The axes of the pillars 32 and 33 extend in the lateral direction of the covers 23 and 24. Insertion holes 32a and 33a respectively extend through the pillars 32 and 33 in the axial direction of the pillars 32 and 33. The bolts B are inserted through the insertion holes 32a and 33a.

Figure 4:
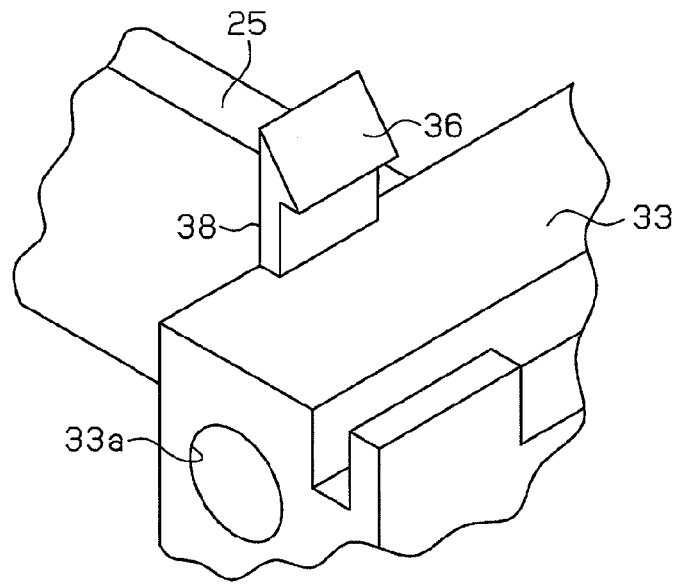
FIG. 4 is an enlarged perspective view of an engagement projection shown in FIG. 3A.

As shown in FIG. 4, engagement projections 37 and 38 respectively extend from the pillars 32 and 33 in the direction opposite to the accommodation portion S1. Each of the distal ends of the engagement projections 37 and 38 (ends opposite to pillars 32 and 33) includes an engagement portion 36, which has the form of a triangular pillar.

As shown in FIG. 3A, the engagement projection 37 of the pillar 32 and the engagement projection 38 of the pillar 33 are located at slightly deviated positions in the axial direction of the pillars 32 and 33.

As shown in FIG. 3B, the second battery holder 41 is identical in form to the first battery holder 21 except that the second battery holder 41 does not include the engagement projections 37 and 38. Thus, the same portions as the first battery holder 21 are given the same reference numerals as the first battery holder 21. Such portions will not be described.

Figure 5:
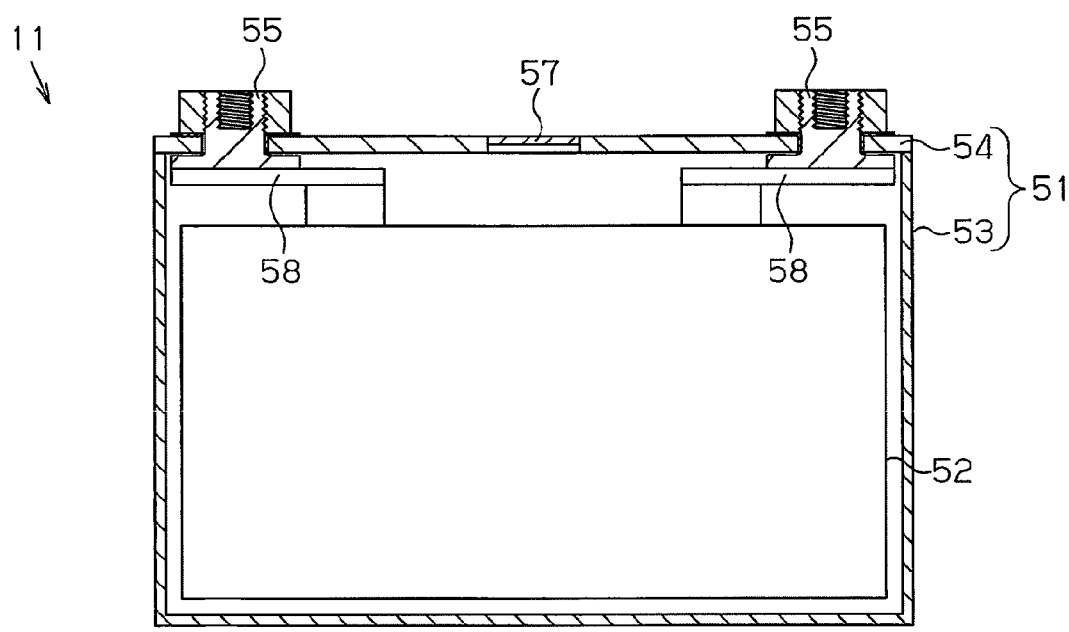
FIG. 5 is a cross-sectional view of a rechargeable battery shown in FIG. 3A.

As described above, the rechargeable batteries 11 are held by the battery holders 21 and 41. As shown in FIG. 5, the rechargeable battery 11 includes a case 51 and an electrode assembly 52, which is accommodated in the case 51. The electrode assembly 52 includes a positive electrode and a negative electrode. The case 51 includes a box-shaped body 53, which has a closed end and accommodates the electrode assembly 52, and a lid 54, which has the form of a plate and closes an opening of the body 53. The lid 54 includes connection terminals 55 (positive terminal and negative terminal). The lid 54 also includes a release valve 57, which is torn to open when the internal pressure of the case 51 increases to a threshold value. The threshold value is set to a pressure that tears the release valve 28 before the case 51 is damaged by the increased internal pressure of the case 51.

The connection terminals 55 are electrically connected to the electrode assembly 52 by conductors 58, respectively.

As shown in FIGS. 1 and 2, the battery module 10 includes a cover member 60 that opposes the surfaces (lids 54) of the rechargeable batteries 11 on which the release valves 57 are arranged. The cover member 60 includes, for example, electronic components, which are used to charge and discharge the rechargeable batteries 11, and a battery ECU, which controls the battery module 10. The cover member 60 includes a first cover 61 and a second cover 62, which are formed from a resin. The first cover 61 and the second cover 62 are arranged next to each other in the layout direction of the rechargeable batteries 11.

Figure 6:
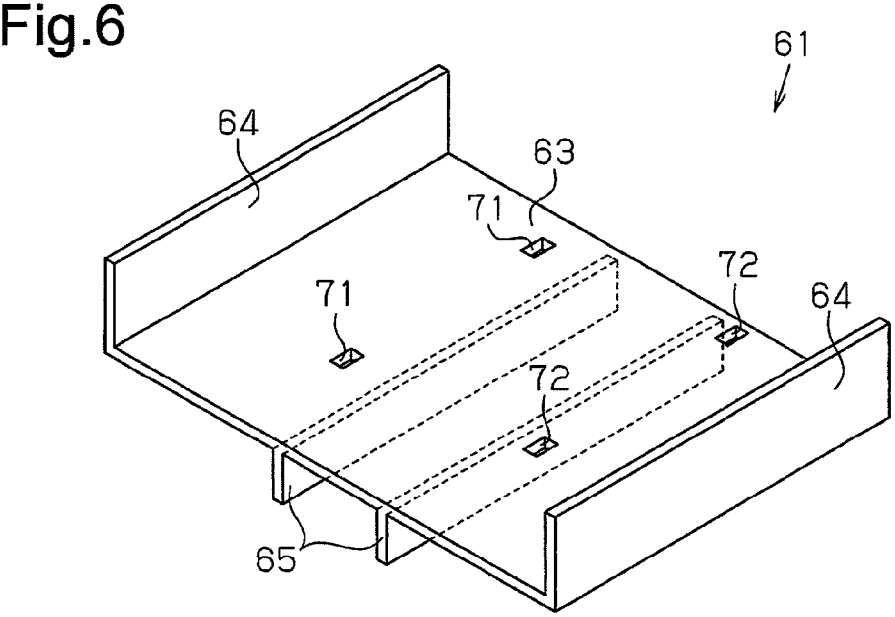
FIG. 6 is a perspective view of a first cover shown in FIG. 1.

As shown in FIG. 6, the first cover 61 includes a body 63, which has the form of a rectangular plate. The two longitudinal ends of the body 63 each include an upright portion 64, which projects in the thickness-wise direction of the body 63. Further, the first cover 61 includes two extensions 65, which have the form of rectangular plates. The two extensions 65 are arranged on the surface opposite to the surface of the body 63 on which the upright portions 64 are arranged. The two extensions 65 are spaced apart and arranged adjacent to each other in the longitudinal direction of the body 63. The two extensions 65 extend over the entire body 63 in the lateral direction. More specifically, the longitudinal length of each of the two extensions 65 is the same as the lateral length of the body 63.

The body 63 of the first cover 61 includes four through holes 71 and 72, which extend through the body 63 in the thickness-wise direction of the body 63. More specifically, the body 63 includes two through holes 71 and two through holes 72. The through holes 71 and 72 are located at opposite sides of the two extensions 65 in the longitudinal direction of the body 63. The through holes 71 and 72 are located at portions that differ from the portion of the body 63 between the two extensions 65. The through holes 71 and 72 are located at slightly deviated positions in the lateral direction of the body 63. The deviation width of the through holes 71 and 72 is the same as that of the engagement projections 37 and 38 of the pillars 32 and 33.

Figure 7:
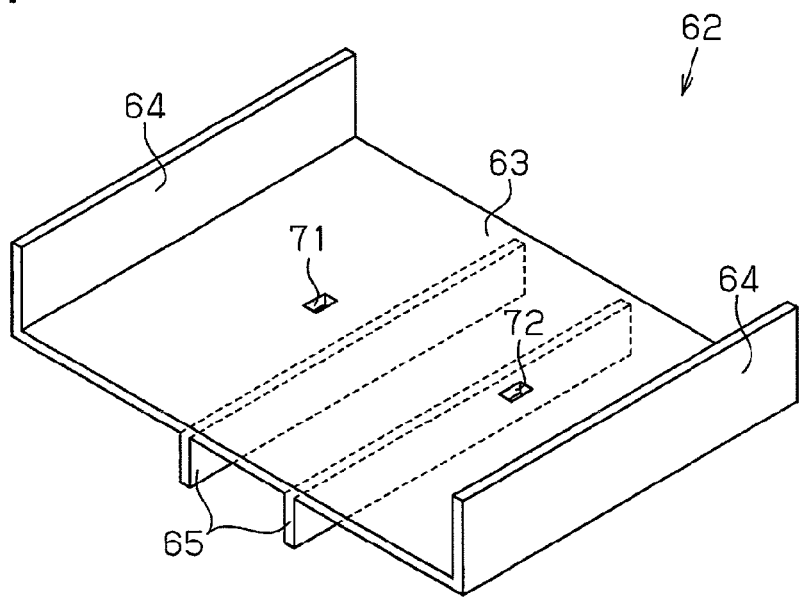
FIG. 7 is a perspective view of a second cover shown in FIG. 1.

As shown in FIG. 7, the second cover 62 has the same structure as the first cover 61 except for the difference in the locations and the number of the through holes 71 and 72 of the body 63. Thus, the same portions as the first cover 61 are given the same reference numerals and will not be described. Only the locations of the through holes 71 and 72 will be described.

The body 63 of the second cover 62 includes two through holes 71 and 72, which extend through the body 63 in the thickness-wise direction of the body 63. More specifically, the through holes 71 and 72 are located at opposite sides of the two extensions 65 in the longitudinal direction of the body 63. The through holes 71 and 72 are located at slightly deviated positions in the lateral direction of the body 63. The deviation width of the through holes 71 and 72 is the same as that of the engagement projections 37 and 38 of the pillars 32 and 33.

As shown in FIG. 2, the body 63 of the first cover 61 and the body 63 of the second cover 62 oppose the surfaces of the rechargeable batteries 11 on which the release valves 57 are arranged. The upright portion 64 of the first cover 61 and the upright portion 64 of the second cover 62 respectively extend along the protrusions 26. Thus, the protrusions 26 of the battery holders 21 and 41 extend along the upright portions 64. In the present embodiment, the body 63 of the first cover 61 and the body 63 of the second cover 62 form the body of the cover member 60, and the upright portion 64 of the first cover 61 and the upright portion 64 of the second cover 62 form the upright portion of the cover member 60. Accordingly, in the following description, the body 63 of the first cover 61 and the body 63 of the second cover 62 are referred to as the body 63 of the cover member 60, and the upright portion 64 of the first cover 61 and the upright portion 64 of the second cover 62 are referred to as the upright portion 64 of the cover member 60.

As shown in FIGS. 1 and 2, the cover member 60 is arranged so that the surface of the body 63 on which the extensions 65 are arranged opposes the rechargeable batteries 11. Thus, the extensions 65 are arranged between the body 63 of the cover member 60 and the cases 51 (lids 54) of the rechargeable batteries 11. Further, the through holes 71 and 72 extend through the case 51 in the direction the through holes 71 and 72 oppose the case 51. The distance separating the through holes 71 and 72 that are adjacent to each other in the layout direction of the rechargeable batteries 11 is the same as the distance separating the engagement projections 37 and 38 that are adjacent to each other in the layout direction of the rechargeable batteries 11. The engagement projections 37 and 38 of the first battery holder 21 respectively extend through the through holes 71 and 72 in the body 63 of the cover member 60. The engagement portions 36 of the engagement projections 37 and 38, which extend through the through holes 71 and 72, respectively engage the rims (body 63) of the through holes 71 and 72. Further, the upright portions 64 of the cover member 60 extend along the protrusions 26 of the battery holders 21 and 41, and distal ends of the upright portions 64 (ends opposite to body 63) engage the projections 27.

Distal ends of the extensions 65, that is, ends of the extensions 65 opposite to the body 63, abut against the surfaces (lids 54) of the rechargeable batteries 11 on which the release valves 57 are arranged. The two extensions 65 oppose each other so that the release valves 57 are located between the two extensions 65. The two extensions 65, the body 63, and the lid 54 define a flow passage 81. The flow passage 81 is located between the two extensions 65. Thus, the through holes 71 and 72, which are located in the portion of the body 63 that differs from the portions between the two extensions 65, are located in portions of the body 63 at the outer side of the flow passage 81. The release valves 57 are exposed to the flow passage 81. Gas discharged out of the release valves 57 into the flow passage 81 flows through the flow passage 81. The flow passage 81 extends to the two end plates 12, which are respectively arranged at the two ends in the layout direction of the rechargeable batteries 11.

The operation of the battery module 10 of the present embodiment will now be described.

When an abnormality occurs in a rechargeable battery 11 and the internal pressure of the case 51 increases to the threshold value, the corresponding release valve 57 is torn. This discharges gas into the flow passage 81. The gas flows in the layout direction of the rechargeable batteries 11 and is discharged out of the battery module 10.

When repeated expansion or contraction caused by the ambient temperature or vibration occurs, this may deform the body 63 of the cover member 60 and separate the body 63 from the rechargeable batteries 11, that is, warp the body 63 in the thickness-wise direction of the body 63. However, the engagement projections 37 and 38 limit such deformation.

Accordingly, the above embodiment has the advantages described below.

(1) The body 63 of the cover member 60 includes the through holes 71 and 72. The first battery holder 21 includes the engagement projections 37 and 38, which extend through the through holes 71 and 72 and engage with the body 63. When the body 63 of the cover member 60 deforms in the direction that separates the body 63 from the rechargeable batteries 11, that is, when the body 63 deforms in the direction the body 63 opposes the release valves 57, the engagement projections 37 and 38 restrict deformation of the cover member 60. This limits deformation of the body 63 and limits the formation of gaps between the distal ends of the extensions 65 and the surfaces (cases 51) of the rechargeable batteries 11 on which the release valves 57 are arranged. Thus, the leakage of gas from the flow passage 81 is limited.

(2) The through holes 71 and 72 are located at portions of the body 63 at the outer side of the flow passage 81. That is, the through holes 71 and 72 are located at portions that differ from portions of the body 63 at opposite sides of the two extensions 65. Thus, the through holes 71 and 72 disconnect the inner side and the outer side of the flow passage 81. Accordingly, gas does not easily leak through the through holes 71 and 72.

(3) The upright portions 64 of the cover member 60 extend along the protrusions 26 of the battery holders 21 and 41. This increases the contact area of the cover member 60 and the battery holders 21 and 41 and limits displacement of the cover member 60. More specifically, displacement of the cover member 60 in the thickness-wise direction of the body 63 is limited.

(4) The upright portions 64 are used, and the protrusions 26 limit deformation of the upright portions 64. Thus, the body 63 of the cover member 60 is easily deformed. This further highlights the advantage in which the engagement projections 37 and 38 limit deformation of the body 63.

(5) The number of the through holes 71 and 72 differs between the first cover 61 and the second cover 62. Thus, if the positions of the first cover 61 and the second cover 62 are switched when attaching the cover member 60, the first cover 61 overlaps the second cover 62 or gaps are formed between the first cover 61 and the second cover 62. This allows for acknowledgement of the arrangement of the first cover 61 and the second cover 62 at incorrect positions. Thus, the first cover 61 and the second cover 62 may be arranged at correct positions.

(6) The through holes 71 and 72 are located at opposite sides of the two extensions 65 in the longitudinal direction of the body 63. The through holes 71 and 72 are deviated in the lateral direction of the body 63. Thus, when the directions of the first cover 61 and the second cover 62 are opposite, more specifically, when the longitudinal directions of the first cover 61 and the second cover 62 are opposite, the attachment of the first cover 61 and the second cover 62 cannot be achieved. This allows the first cover 61 and the second cover 62 to be arranged in correct directions.

(7) To limit deformation of the body 63 in the thickness-wise direction, the thickness of the body 63 may be increased to increase rigidity. However, this will increase the amount of material used for the cover member 60 and increase the manufacturing cost. Further, when manufacturing the cover member 60 through injection molding, a thick body 63 would increase warping and sink marks (depressions) of the body 63. The engagement projections 37 and 38 limit deformation of the body 63 in the thickness-wise direction. This reduces the thickness of the body 63 and limits increases in the manufacturing cost. Further, warping and the formation of sink marks may be limited in the body 63.

The embodiment may be modified as described below.

The extensions 65 may be arranged on the battery holders 21 and 41 or the rechargeable batteries 11. In this case, the extensions 65 abut against the body 63 of the cover member 60. The engagement projections 37 and 38 limit deformation of the body 63 of the cover member 60. This limits the formation of gaps between the extensions 65 and the body 63 of the cover member 60.

The portion between the extensions 65 of the body 63 of the cover member 60, that is, the portion in the flow passage 81, may include an engaged portion with which the engagement projections 37 and 38 are engageable. In this case, the engagement projections 37 and 38 engage the engaged portion. When the engaged portion is arranged between the extensions 65 of the body 63 and the engaged portion does not extend through the body 63 in the thickness-wise direction of the body 63, connection is limited between the inner side and the outer side of the flow passage 81.

The cover member 60 may be formed by only the body 63 and less the upright portions 64.

The cover member 60 does not have to be formed by the covers 61 and 62. Instead, the cover member 60 may be formed by a single member, that is, a single cover.

The battery holders 21 and 41 may all include the engagement projections 37 and 38. That is, only the first battery holders 21 may be used as the battery holders 21 and 41. In this case, the number of the through holes 71 and 72 in the cover member 60 is changed in correspondence with the number of the engagement projections 37 and 38 on the battery holders 21 and 41.

The engagement projections 37 and 38 do not have to be deviated in the axial direction of the pillars 32 and 33. In this case, the through holes 71 and 72 do not have to be deviated.

The forms of the engagement projections 37 and 38 may be changed so that the engagement projections 37 and 38 extend through only the corresponding through holes 71 and 72. This limits situations in which the layout of the first cover 61 and the second cover 62 is reversed.

The engagement projections 37 and 38 are arranged on both of the pillars 32 and 33 on the first battery holder 21. Instead, the engagement projections 37 and 38 may be arranged on only one of the pillars 32 and 33.

The engagement projections 37 and 38 are arranged on the pillars 32 and 33 of the first battery holder 21. Instead, the engagement projections 37 and 38 may be arranged at other locations. For example, the engagement projections 37 and 38 may be arranged on the fourth cover 25 or the terminal accommodation portion 31.

A U-shaped partition member may be used to define the flow passage 81. In this case, the partition member is pressed by the body 63 of the cover member 60 toward the rechargeable batteries 11 to form the flow passage 81. That is, the flow passage 81 does not have to be formed by the body 63 of the cover member 60 and the extensions 65, and the flow passage 81 may be formed by pressing other members with, for example, the cover member 60.

There may be only a single rechargeable battery 11.

There may be a single battery holder. A single battery holder may hold a plurality of rechargeable batteries 11. Alternatively, a single battery holder may hold a single rechargeable battery 11.

The invention claimed is:

1. A battery module comprising:
a rechargeable battery that includes an electrode assembly including a positive electrode and a negative electrode, a case that accommodates the electrode assembly, and a release valve that releases gas from the case to an outer side of the case;
a battery holder that holds the rechargeable battery;
a cover member including a body opposed to the release valve; and
two extensions arranged between the case and the body of the cover member, wherein the two extensions are opposed to each other so that the release valve is located between the two extensions, wherein
the case, the body of the cover member, and the two extensions define a flow passage for gas discharged from the release valve, and
the battery holder includes an engagement projection that engages the body of the cover member.

2. The battery module according to claim 1, wherein
the body of the cover member includes a through hole that extends through the case in a direction the case opposes the body,
the through hole is located at an outer side of the flow passage, and
the engagement projection extends through the through hole and engages with the body.

3. The battery module according to claim 1, wherein
the cover member includes an upright portion extending from the body of the cover member in a direction opposite to the extensions, and
the battery holder includes a protrusion extending along the upright portion.

4. The battery module according to claim 1, comprising a plurality of rechargeable batteries, wherein the rechargeable batteries are laid out next to each other.

5. The battery module according to claim 4, further comprising a battery holder that is less the engagement projection.

6. The battery module according to claim 4, wherein
the cover member includes a first cover and a second cover that are arranged next to each other in a layout direction of the rechargeable batteries, and
the through holes of the first cover differ in number from the through holes of the second cover.

7. The battery module according to claim 1, wherein the cover member includes the extensions.

* * * * *